(12) United States Patent
Samuel

(10) Patent No.: US 8,046,998 B2
(45) Date of Patent: Nov. 1, 2011

(54) WASTE HEAT AUXILIARY POWER UNIT

(75) Inventor: Woodson Wayne Samuel, Long Beach, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 338 days.

(21) Appl. No.: 12/243,663

(22) Filed: Oct. 1, 2008

(65) Prior Publication Data

US 2010/0077741 A1    Apr. 1, 2010

(51) Int. Cl.
*F01K 23/10*    (2006.01)
*F01K 3/00*     (2006.01)
*F01K 13/02*    (2006.01)

(52) U.S. Cl. ............................................ 60/618; 60/652

(58) Field of Classification Search ............ 60/614–624, 60/652
See application file for complete search history.

(56) References Cited

U.S. PATENT DOCUMENTS

| | | | |
|---|---|---|---|
| 3,350,876 A * | 11/1967 | Johnson .......................... | 60/618 |
| 3,830,062 A * | 8/1974 | Morgan et al. .................. | 60/618 |
| 3,979,913 A | 9/1976 | Yates | |
| 4,031,705 A | 6/1977 | Berg | |
| 4,201,058 A | 5/1980 | Vaughan | |
| 4,276,747 A * | 7/1981 | Faldella et al. ................. | 60/618 |
| 4,300,353 A * | 11/1981 | Ridgway ........................ | 60/618 |
| 4,393,656 A | 7/1983 | Anderson et al. | |
| 4,405,029 A | 9/1983 | Hunt | |
| 4,470,476 A | 9/1984 | Hunt | |
| 4,586,338 A * | 5/1986 | Barrett et al. .................. | 60/618 |
| 4,592,436 A | 6/1986 | Tomei | |
| 4,996,845 A | 3/1991 | Kim | |
| 5,000,003 A | 3/1991 | Wicks | |
| 5,008,062 A | 4/1991 | Anderson et al. | |
| 5,176,000 A | 1/1993 | Dauksis | |
| 5,191,766 A | 3/1993 | Vines | |
| 5,228,925 A | 7/1993 | Nath et al. | |
| 5,327,987 A | 7/1994 | Abdelmalek | |
| 5,385,211 A | 1/1995 | Carroll | |
| 5,398,747 A | 3/1995 | Miaoulis | |
| 5,708,306 A * | 1/1998 | Lin ............................ | 307/10.1 |
| 5,800,631 A | 9/1998 | Yamada et al. | |
| 5,806,332 A * | 9/1998 | Shea, Sr. ...................... | 62/323.3 |
| 6,202,782 B1 | 3/2001 | Hatanaka | |
| 6,369,316 B1 | 4/2002 | Plessing et al. | |
| 6,423,894 B1 | 7/2002 | Patz et al. | |
| 6,450,283 B1 * | 9/2002 | Taggett ......................... | 180/304 |
| 6,536,828 B2 | 3/2003 | Love et al. | |
| 6,571,552 B2 | 6/2003 | Ban et al. | |
| 6,586,668 B2 | 7/2003 | Shugar et al. | |
| 6,729,137 B2 | 5/2004 | Filippone | |

(Continued)

FOREIGN PATENT DOCUMENTS

JP    2006299858    11/2006

(Continued)

*Primary Examiner* — Thomas Denion
*Assistant Examiner* — Christopher Jetton
(74) *Attorney, Agent, or Firm* — Snell & Wilmer LLP

(57) ABSTRACT

The present invention relates to a waste heat auxiliary power unit. In one embodiment, the present invention is a heat exchange unit for an automobile including a core unit configured to be connected to a catalytic converter of the automobile, the core unit generating vapor, and a first energy generation module connected to the core unit, the first energy generation module receiving the vapor from the core unit and generating energy from the vapor.

27 Claims, 3 Drawing Sheets

U.S. PATENT DOCUMENTS

| | | | |
|---|---|---|---|
| 6,739,389 B2 | 5/2004 | Nakagawa et al. | |
| 6,904,766 B2 | 6/2005 | Ito et al. | |
| 6,910,333 B2 | 6/2005 | Minemi et al. | |
| 6,913,068 B2 | 7/2005 | Togawa et al. | |
| 7,056,251 B2 | 6/2006 | Ibaraki | |
| 7,104,063 B2 | 9/2006 | Clemens | |
| 7,181,919 B2 | 2/2007 | Uno et al. | |
| 7,246,487 B2 | 7/2007 | Hara | |
| 7,253,353 B2 * | 8/2007 | Stabler | 136/205 |
| 7,309,831 B2 | 12/2007 | Yamada et al. | |
| 7,430,865 B2 * | 10/2008 | Filippone | 60/618 |
| 7,520,133 B2 * | 4/2009 | Hoetger et al. | 60/618 |
| 2005/0012021 A1 | 1/2005 | Middelman et al. | |
| 2005/0046195 A1 | 3/2005 | Kousoulis | |
| 2005/0133082 A1 | 6/2005 | Konold et al. | |
| 2005/0262842 A1 | 12/2005 | Claassen et al. | |
| 2006/0032226 A1 * | 2/2006 | Filippone | 60/645 |
| 2006/0207644 A1 | 9/2006 | Robinson et al. | |
| 2006/0231235 A1 | 10/2006 | Yamanaka et al. | |
| 2007/0101716 A1 | 5/2007 | Tafas | |
| 2007/0137851 A1 | 6/2007 | Hamada et al. | |
| 2007/0227144 A1 | 10/2007 | Yaguchi et al. | |
| 2007/0235164 A1 | 10/2007 | Miyagawa et al. | |
| 2007/0245737 A1 | 10/2007 | Inaba et al. | |
| 2007/0284087 A1 | 12/2007 | Kohara et al. | |
| 2007/0289721 A1 | 12/2007 | Miyagawa et al. | |
| 2008/0022681 A1 | 1/2008 | Tafas | |
| 2008/0022682 A1 | 1/2008 | Tafas | |
| 2008/0034728 A1 | 2/2008 | Tafas | |
| 2008/0034729 A1 | 2/2008 | Tafas | |
| 2008/0041046 A1 | 2/2008 | Bering | |
| 2008/0072583 A1 | 3/2008 | Sakita | |
| 2008/0115923 A1 | 5/2008 | Yamanaka et al. | |
| 2008/0216480 A1 | 9/2008 | Harmon et al. | |
| 2008/0236653 A1 | 10/2008 | Kelly | |

FOREIGN PATENT DOCUMENTS

| | | |
|---|---|---|
| WO | WO 2007032801 | 3/2007 |

* cited by examiner

WASTE HEAT AUXILIARY POWER UNIT

BACKGROUND

1. Field

The present invention relates to a waste heat auxiliary power unit.

2. Background

With global energy prices increasing, the cost of operating an automobile for transportation also increases. The cost of operating an automobile may be affected by its weight and also fuel consumption efficiencies. However, traditional automobiles may be overweight and do not fully and efficiently utilize the fuel consumed by the automobile.

Thus, there is a need for a more efficient automobile with a reduced amount of weight.

SUMMARY

In one embodiment, the present invention is a heat exchange unit for an automobile including a core unit configured to be connected to a catalytic converter of the automobile, the core unit generating vapor, and a first energy generation module connected to the core unit, the first energy generation module receiving the vapor from the core unit and generating energy from the vapor.

In another embodiment, the present invention is an automobile including an engine, a catalytic converter connected to the engine, the catalytic converter receiving hot air from the engine, and a heat exchange unit connected to the catalytic converter, the heat exchange unit receiving the hot air from the catalytic converter and utilizing the hot air to generate energy.

In yet another embodiment, the present invention is an automobile including an engine, a generator connected to the engine, a main battery connected to the generator, a catalytic converter connected to the engine, the catalytic converter receiving hot air from the engine, a heat exchange unit connected to the catalytic converter. The heat exchange unit can include a core unit receiving hot air from the catalytic convertor and generating vapor, a first energy generation module connected to the core unit and configured to generate electricity for a first range of vapor pressures, and a second energy generation module connected to the core unit and configured to generate electricity for a second range of vapor pressures. The automobile can also include a starter connected to the engine, an auxiliary battery connected to the heat exchange unit and the starter, an air conditioning unit connected to the heat exchange unit, an electronic accessory connected to the heat exchange unit, and an engine control unit connected to the heat exchange.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
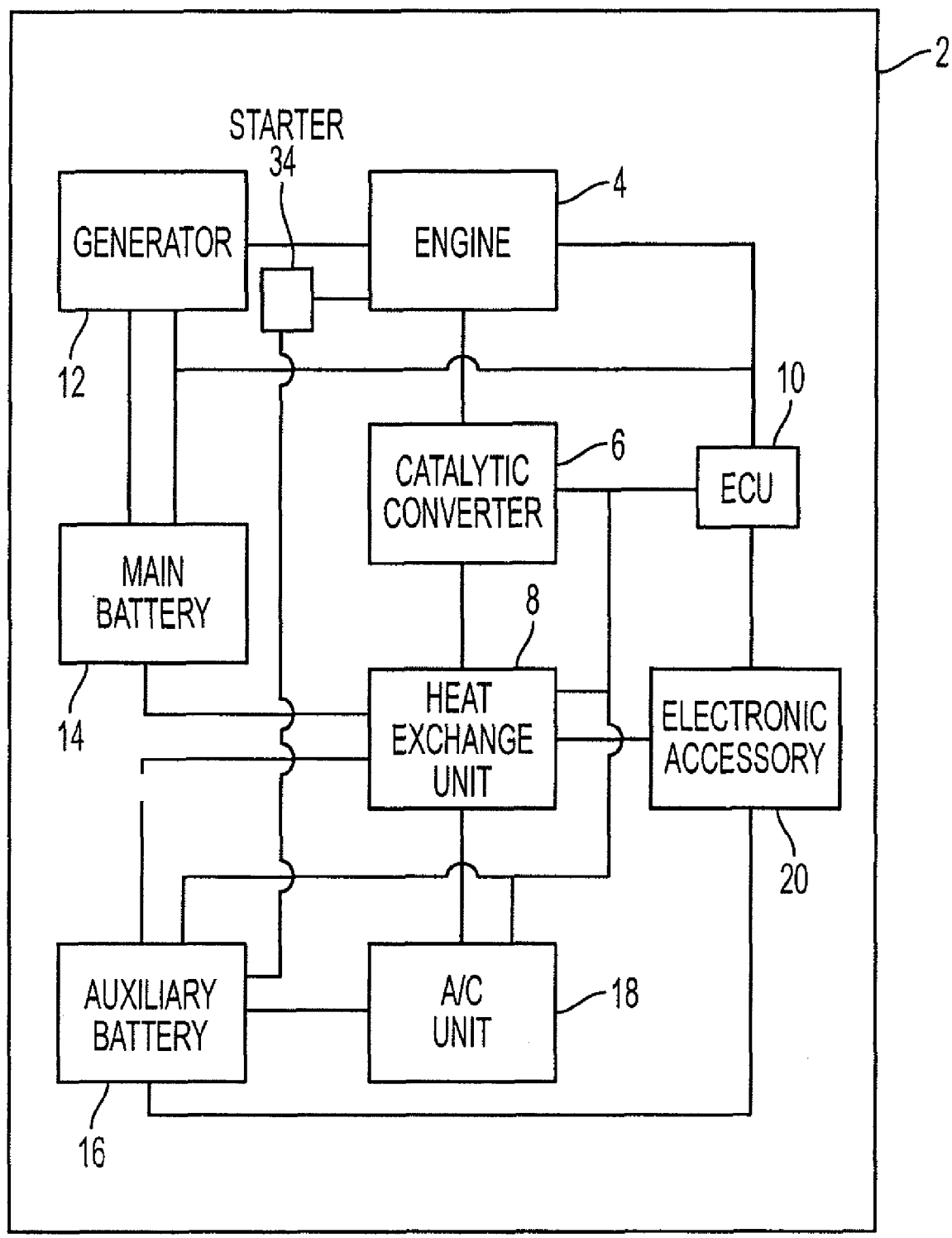
FIG. 1 is a block diagram of the components of an automobile according to an embodiment of the present invention.

FIG. 1 is a block diagram of the components of an automobile 2. Automobile 2 includes an engine 4, a catalytic converter 6, a heat exchange unit 8, an engine control unit ("ECU") 10, a generator 12, a main battery 14, an auxiliary battery 16, an air conditioning unit 18, and an electronic accessory 20. In one embodiment, automobile 2 is a hybrid vehicle. However, automobile 2 can be any type of vehicle such as a vehicle with an internal combustion engine, a vehicle with a hydrogen engine, a vehicle with an ethanol engine, etc. Furthermore, the present invention is not limited to just automobiles, but may also encompass any type of transportation units such as airplanes, helicopters, tanks, trucks, etc.

Engine 4 is connected to starter 34, generator 12, catalytic converter 6, and ECU 10. Engine 4 is utilized to move automobile 2 but can also be used to power main battery 14 through generator 12. Engine 4 can be activated by starter 34 and is monitored by ECU 10. Once activated engine 4 generates heat during the combustion process and waste air is generated. The waste air from the combustion process is passed to catalytic converter 6 and can have, for example, a temperature of about 1600 degrees Fahrenheit. Engine 4 transfers the waste air to catalytic converter 6. Engine 4 can be an internal combustion engine, a hybrid engine, a hydrogen engine, a natural gas engine, an ethanol engine, or any other type of engine sufficient to generate power to move automobile 2.

Starter 34 is connected to engine 4 and auxiliary battery 16. Starter 34 receives energy from auxiliary battery 16 and is used to activate engine 4. Generator 12 is connected to engine 4 and main battery 14. Generator 12 can generate energy for main battery 14 using power supplied by engine 4.

Main battery 14 is connected to generator 12 and heat exchange unit 8. Main battery 14 receives energy from engine 4 to recharge main battery 14 through generator 12. Main battery 14 can also be used to power a motor (not shown) which could aid in driving or moving automobile 2. In one embodiment, main battery 14 is a high voltage battery.

Catalytic converter 6 is connected to engine 4, ECU 10, and heat exchange unit 8. Catalytic converter 6 receives the waste air from engine 4 and cleans the waste air to reduce the toxicity of the waste air. This can be accomplished, for example, through chemical reactions. Catalytic converter 6 then transfers the waste air to heat exchange unit 8.

Auxiliary battery 16 is connected to starter 34, air conditioning unit 18, heat exchange unit 8, and ECU 10. Instead of being charged solely through engine 4 via an alternator, auxiliary battery 16 may be charged through heat exchange unit 8. Thus, in one embodiment, the alternator can be removed from automobile 2 as the alternator would be unnecessary. Advantageously this can reduce a load on engine 4 and a weight of automobile 2. Both of these factors can allow automobile 2 to be more efficient. Auxiliary battery 16 can supply power to electronic accessory 20 and/or air conditioning unit 18.

Air conditioning unit 18 is connected to heat exchange unit 8, auxiliary battery 16, and ECU 10. Instead of receiving its energy from engine 4, air conditioning unit 18 can receive energy directly from heat exchange unit 8 or indirectly from heat exchange unit 8 through auxiliary battery 16. By receiving energy from heat exchange unit 8 instead of engine 4, a generator and/or solenoid may be removed from automobile 2. That is, instead of connecting a generator and/or solenoid from engine 4 to air conditioning unit 18, air conditioning unit 18 can be connected to heat exchange unit 8 and/or auxiliary battery 16. Advantageously this can reduce a weight of automobile 2. Furthermore, if engine 4 can operate without having to drive a generator and/or solenoid, this can also reduce a load or strain on engine 4. By reducing a weight of automobile 4 and the load or strain on engine 4, this can improve the fuel efficiency of automobile 2 as well as reduce the production cost of automobile 2.

Electronic accessory 20 is connected to heat exchange unit 8, auxiliary battery 16, and ECU 10. Electronic accessory 20 can be powered directly through heat exchange unit 8 or indirectly from heat exchange unit 8 through auxiliary battery 16. Electronic accessory 20 can be, for example, an audio device, a video device, an audio/video device, a fan, a mobile phone, or any other types of electronic equipment that can be used in an automobile.

ECU 10 is connected to engine 4, catalytic converter 6, heat exchange unit 8, generator 12, main battery 14, auxiliary battery 16, air conditioning unit 18, and electronic accessory 20. ECU 10 can monitor and/or control the functions of engine 4, catalytic converter 6, heat exchange unit 8, generator 12, main battery 14, auxiliary battery 16, air conditioning unit 18, and/or electronic accessory 20.

Heat exchange unit 8 is connected to catalytic convertor 6, auxiliary battery 16, air conditioning unit 18, electronic accessory 20, and ECU 10. Heat exchange unit 8 receives the waste air from catalytic converter 6. Although the waste air may have lost some of its energy during the catalytic conversion process in catalytic converter 6, it still possesses sufficient energy to produce a state change in a material from a liquid to a vapor. Heat exchange unit 8 can be constructed from material that provides high temperature resistance such as stainless steel or other alloys. It may be advantageous to have heat exchange unit 8 be located as close in location to catalytic converter 6 in order to reduce the loss of energy by waste air through transportation of the waste air from catalytic converter 6 to heat exchange unit 8.

Figure 2:
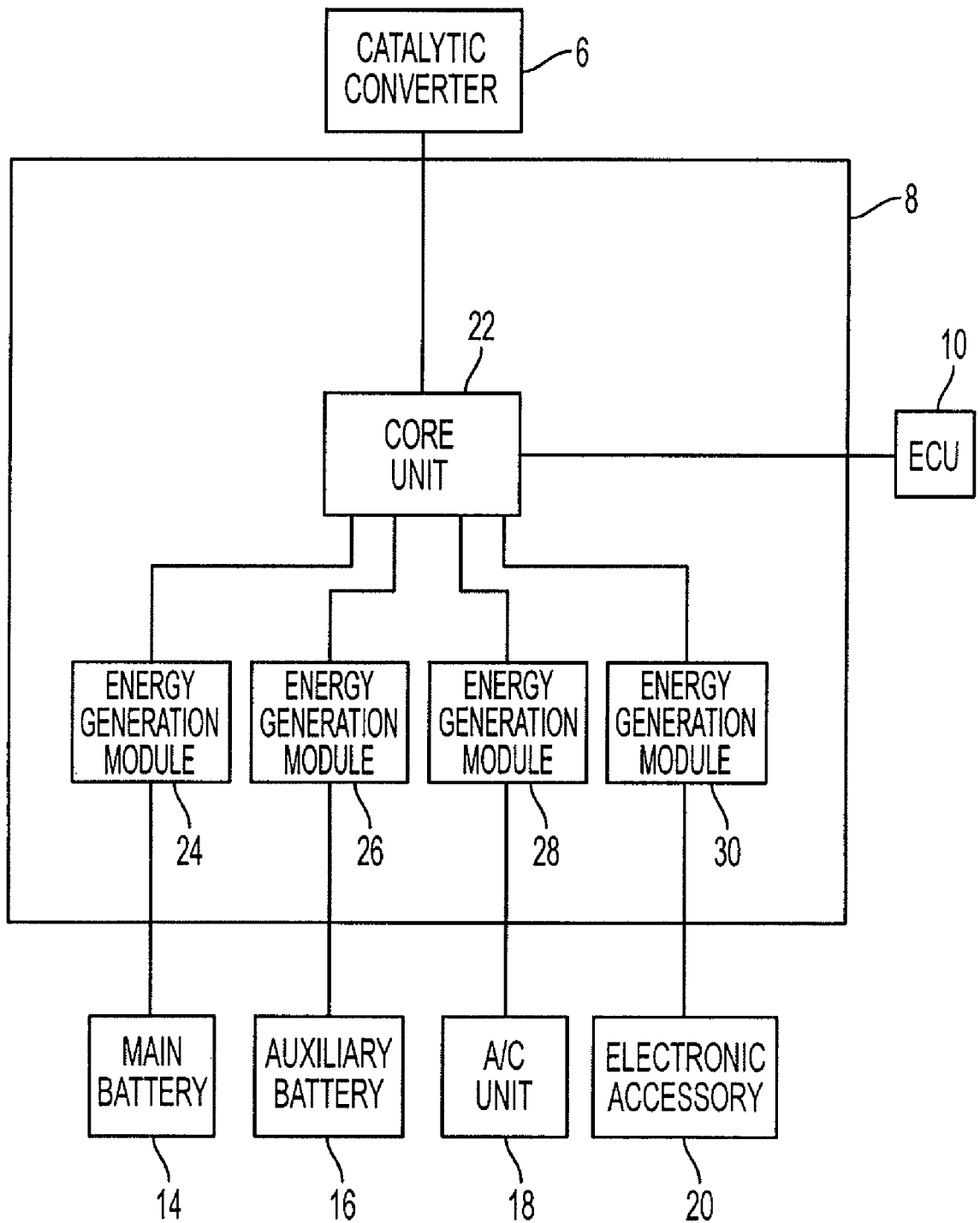
FIG. 2 is a block diagram of a heat exchange unit according to an embodiment of the present invention.

FIG. 2 is a block diagram of a heat exchange unit according to an embodiment of the present invention. Heat exchange unit 8 includes a core unit 22 and energy generation modules 24, 26, 28 and 30. In one embodiment, core unit 22 receives the waste air from catalytic converter 6 and uses the waste air to generate vapor by transforming a liquid to vapor using the heat from the waste air. This can be accomplished, for example, using an accumulator and valve systems (not shown). In one embodiment, the liquid is isolated from the waste air such that heat can be transferred from the waste air to the liquid, but the liquid and the waste air do not actually mix. This can be done, for example, by using thermo conductive material to segregate the waste air and the liquid. The vapor generated by core unit 22 is then selectively passed to energy generation modules 24, 26, 28 and 30.

Energy generation modules 24, 26, 28 and 30 can each be designed for a specific range of vapor pressures and the appropriate energy generation module or energy generation modules are activated depending on the vapor pressure in core unit 22. That is, energy generation module 24 might be optimized for used with a relatively high vapor pressure whereas energy generation module 30 may be optimized for use with a relatively low vapor pressure. In one embodiment, an energy generation module that is configured to be connected to a device that utilizes a high energy output is configured to be used with relatively high vapor pressures because it is contemplated that relatively high vapor pressures can generate a higher amount of energy. For example, since energy generation module 28 is connected to air conditioning unit 18, energy generation module 28 is configured to be used with a relatively high vapor pressure.

The configuration of each energy generation module 28 can be accomplished by configuring the turbines within each energy generation module. For example, to generate a higher amount of energy with higher vapor pressure, it is contemplated that relatively large turbines are used. Furthermore, smaller turbines can be used where there is a relatively smaller vapor pressure available since smaller turbines can be more easily activated with less pressure than larger turbines. In one embodiment, each device connected to heat exchange unit 8 is connected to a separate energy generation module. Each energy generation module is controlled by ECU 10 and can be activated or deactivated depending on the vapor pressure of the vapor supplied by core unit 22.

In one embodiment, energy generation modules 24, 26, 28 and 30 are modular such that they can be easily removed and replaced with other energy generation modules without having to remove and/or replace heat exchange unit 8. Advantageously this allows damaged energy generation modules to be replaced without having to replace the entire heat exchange unit 8 which can reduce the maintenance cost of heat exchange unit 8 and further extend the life of heat exchange unit 8. In addition, if energy generation modules 24, 26, 28 and 30 are modular, then if new devices are added to automobile 2, new energy generation modules can be added to appropriately address the power consumption needs of the new devices. Furthermore, with advancements in technology, more efficient energy generation modules may be developed, in which case the more efficient energy generation modules may replace the original energy generation modules.

Referring to FIG. 1, in operation, a user activates engine 4. As engine 4 is running, engine 4 is generating waste air that has waste heat at a high temperature. The waste air is transported to catalytic converter 6 where a chemical conversion process is undertaken at the high temperature to reduce the toxicity of the waste air. The waste air is then transferred from catalytic converter 6 to core unit 22 of heat exchange unit 8. Since the waste air still has an extremely high temperature, core unit 22 utilizes the waste air and the extremely high temperature of the waste air to vaporize a liquid within core unit 22. The vapor produced by core unit 22 is then sent to an appropriate energy generation module.

The appropriate energy generation module is then selected by ECU 10. This can be done by examining the vapor pressure of the vapor in core unit 22, the devices which require energy, and the energy generation module which the devices which require energy are connected to. For example, if the vapor pressure had a gauge pressure of 100 psi, and electronic accessory 20, air conditioning unit 18, and main battery 14 are active, then in one embodiment, ECU 10 selects one or more energy generation modules from energy generation module 30, 28 and 24.

Assuming, for example, that energy generation module 30 optimally functions at vapor pressure ranges between 40 psi to 50 psi, energy generation module 28 optimally functions at vapor pressure ranges between 100 psi to 200 psi, and energy generation module 24 optimally functions at vapor pressure ranges between 60 psi to 80 psi, then ECU 10 can select energy generation module 28 to be active since it is optimally configured to handle 100 psi to 200 psi and the vapor pressure is 100 psi. However, ECU 10 can also activate energy generation module 24 and 30 instead of energy generation module 28 since energy generation module 24 is optimal for vapor pressure ranges 40 psi to 50 psi, and energy generation module 30 is optimal for vapor pressure ranges between 60 psi to 80 psi. Thus, the sum of the vapor pressure ranges would be 100 psi to 130 psi, and the vapor pressure is 100 psi which would be within the range of optimal vapor pressures.

In the event that one or more energy generation modules are not activated, the corresponding devices can receive power from auxiliary battery 16. If auxiliary battery 16 is low on charge, a warning can be issued to the user of automobile 2 to reduce the amount of devices the user is operating or the energy usage of the devices such as by reducing the air conditioning power. Furthermore, ECU 10 can also optionally deactivate some devices in order to recharge auxiliary battery 16.

Thus, the present invention utilizes relatively hot waste air, which was previously discarded, allowing engine 4 of automobile 2 to function more efficiently by reducing the load on engine 4 and also reducing the weight of automobile 2. It is contemplated that with the present invention, the fuel efficiency of automobile 2 can be increased by approximately 15% to 20%. That is, if a conventional automobile was getting 45 miles per gallon ("mpg") prior to implementation of the present invention, automobile 2 with implementation of the present invention may get 54 mpg after implementation of the present invention.

Figure 3:
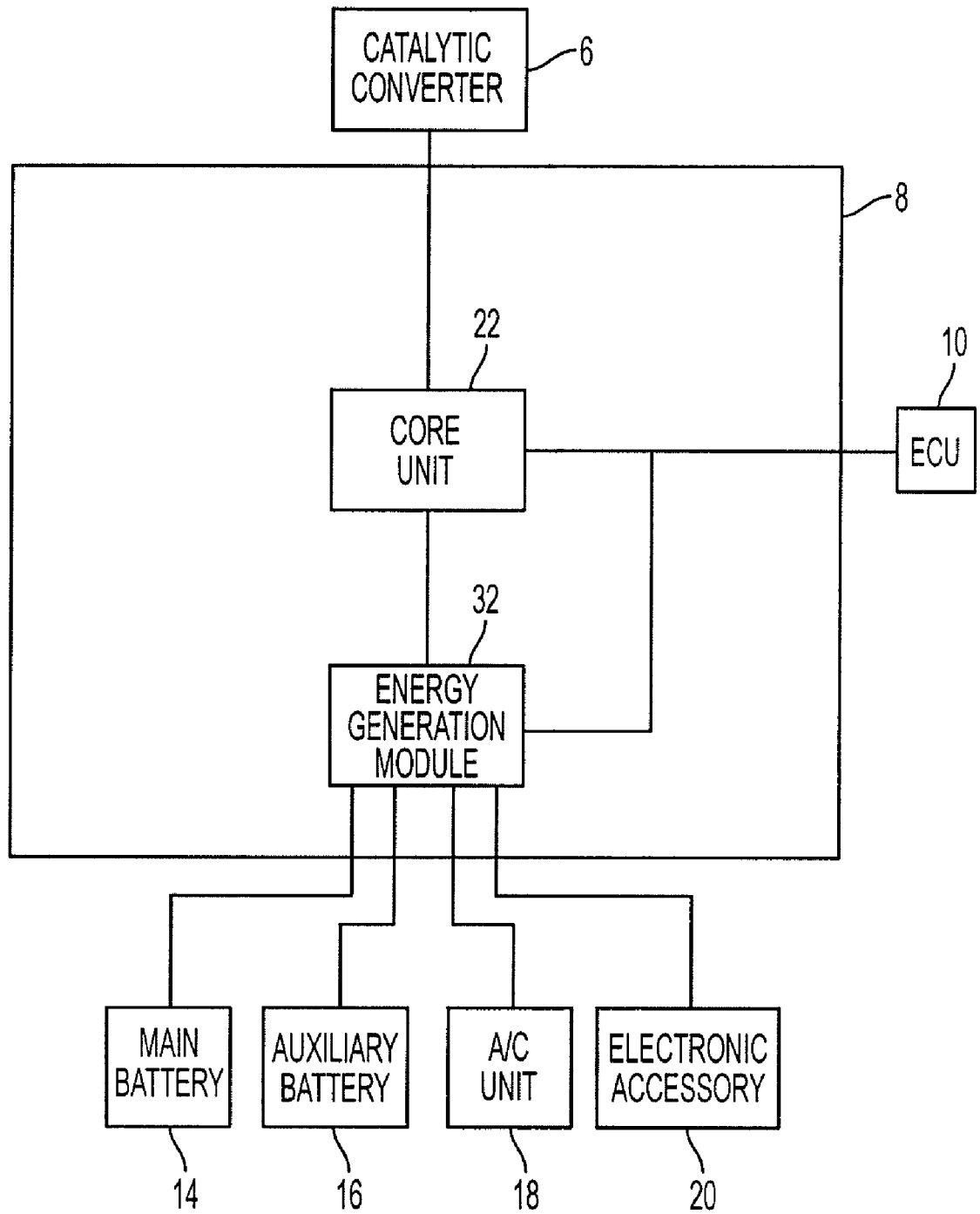
FIG. 3 is a block diagram of a heat exchange unit according to an embodiment of the present invention.

FIG. 3 is a block diagram of a heat exchange unit according to an embodiment of the present invention. Heat exchange unit 8 in FIG. 3 has a single energy generation module 32 instead of multiple energy generation modules as seen in FIG. 2. Core unit 22 transfers the vapor to energy generation module 32 and energy generation module 32 generates energy such as electricity from the vapor. This can be accomplished, for example, through the use of one or more turbines. In FIG. 3, devices such as main battery 14, auxiliary battery 16, air conditioning unit 18, and electronic accessory 20 are connected to energy generation module 32 instead of separate energy generation modules. A switch (not shown) controlled by ECU 10 can be used in energy generation module 32 to determine which of the devices energy generation module 32 should send energy to.

In operation, core unit 22 still produces vapor but sends the vapor to a single energy generation module 32. Energy generation module 32 then utilizes the vapor to produce energy such as by using turbines. ECU 10 then controls which devices (e.g., main battery 14, auxiliary battery 16, air conditioning unit 18, and electronic accessory 20) should be connected to energy generation module 32 to receive power from energy generation module 32.

In another embodiment (not shown), the present invention can have insulative or heat retention materials on the engine to allow the engine to retain heat to generate waste air with even higher temperatures. This could allow more energy production from heat exchange unit 8 and also reduce the load on engine 4.

In yet another embodiment (not shown), heat exchange unit 8 is combined with catalytic converter 6. For example, there may be a chamber within catalytic converter 6 for storage of heat exchange unit 8. This can keep the potentially toxic waste air segregated from the liquid used in heat exchange unit 8 while still allowing the heat of the waste air to vaporize the liquid. It is also contemplated that heat exchange unit 8 can replace the existing catalytic core and refracting liner. Heat exchange unit 8 can include tubes and fins designed to provide maximal thermal transfer with a minimal backpressure.

In still another embodiment, ECU 10 can activate an energy generation module even when the vapor pressure is outside the optimal vapor pressure for the energy generation module. For example, if the vapor pressure is 80 psi, and the optimal vapor pressure for the energy generation module is 40 psi to 60 psi, the energy generation module may still be activated. Likewise if the vapor pressure is 30 psi, and the optimal vapor pressure for the energy generation module is 40 psi to 60 psi, the energy generation module may still be activated.

In another embodiment, a second heat exchange unit (not shown) is connected to heat exchange unit 8 and receives the waste air from heat exchange unit 8. This could allow for more efficient energy capture from the waste air. In still another embodiment, the second heat exchange unit (not shown) is connected to catalytic converter 6 in parallel with heat exchange unit 8.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A heat exchange unit for an automobile comprising:
   a core unit connected to a catalytic converter of the automobile, the core unit configured to receive hot air from the catalytic converter and utilize the hot air to convert a fluid to a vapor;
   a first energy generation module connected to the core unit via a first connection and configured to be activated based upon a first vapor pressure of the vapor, the first connection arranged to selectively pass the vapor generated by the core unit to the first energy generation module, the first energy generation module configured to generate energy using the vapor; and
   a second energy generation module connected to the core unit via a second connection and configured to be activated based upon a second vapor pressure of the vapor, the second connection arranged to selectively pass the vapor generated by the core unit to the second energy generation module, the second generation module configured to generate energy using the vapor.

2. The heat exchange unit of claim 1 wherein the first energy generation module is connected to an auxiliary battery of the automobile.

3. The heat exchange unit of claim 1 wherein the first energy generation module is connected to an air conditioning unit.

4. The heat exchange unit of claim 1 wherein the first energy generation module is connected to a main battery of the automobile.

5. The heat exchange unit of claim 1 wherein the first energy generation module is connected to an electronic accessory of the automobile.

6. The heat exchange unit of claim 2 wherein the second energy generation module is connected to an air conditioning unit of the automobile.

7. An automobile comprising:
   an engine;
   a catalytic converter connected to the engine, the catalytic converter configured to receive hot air from the engine; and a heat exchange unit connected to the catalytic converter, the heat exchange unit including
a core unit configured to receive hot air from the catalytic converter and utilize the hot air to convert a fluid to a vapor,
a first energy generation module having a first connection to the core unit, the first connection arranged to selectively pass the vapor generated by the core unit to the first energy generation module when a vapor pressure of the vapor is within a first range of vapor pressures, the first energy generation module configured to generate energy using the vapor and
a second energy generation module having a second connection to the core unit, the second connection arranged to selectively pass the vapor generated by the core unit to the second energy generation module when the vapor pressure of the vapor is within a second range of vapor pressures, the second energy generation module configured to generate energy using the vapor.

8. The automobile of claim 7 further comprising an engine control unit connected to the heat exchange unit.

9. The automobile of claim 8 wherein the engine control unit is configured to activate the first energy generation module when the vapor pressure of the vapor is within the first range of vapor pressures and the engine control unit is configured to activate the second energy generation module when the vapor pressure of the vapor is within the second range of vapor pressures.

10. The automobile of claim 9 wherein the engine control unit is configured to activate the first energy generation module via the first connection and the second energy generation module via the second connection when the vapor pressure of the vapor is within a third range of vapor pressures.

11. An automobile comprising:
an engine;
a generator connected to the engine;
a main battery connected to the generator;
a catalytic converter connected to the engine, the catalytic converter configured to receive hot air from the engine;
a heat exchange unit connected to the catalytic converter, the heat exchange unit including
a core unit configured to receive hot air from the catalytic convertor and generate vapor,
a first energy generation module connected to the core unit by a first path and configured to be activated for a first range of vapor pressures and output electricity, and
a second energy generation module connected to the core unit by a second path and configured to be activated for a second range of vapor pressures and output electricity;
a starter connected to the engine;
an auxiliary battery connected to the heat exchange unit and the starter;
an air conditioning unit connected to the heat exchange unit;
an electronic accessory connected to the heat exchange unit; and
an engine control unit connected to the heat exchange unit, the engine control unit configured to activate the first energy generation module when a vapor pressure of the vapor is within the first range of vapor pressures and the engine control unit configured to activate the second energy generation module when the vapor pressure of the vapor is within the second range of vapor pressures.

12. The automobile of claim 11 wherein the engine control unit is configured to activate the first energy generation module and the second energy generation module when the vapor pressure of the vapor is within a third range of vapor pressures.

13. The automobile of claim 12 wherein the first energy generation module is configured to be replaced by a third energy generation module without replacing the core unit.

14. The heat exchange unit of claim 2 wherein the second energy generation module is connected to a main battery of the automobile.

15. The heat exchange unit of claim 2 wherein the second energy generation module is connected to an electronic accessory of the automobile.

16. The heat exchange unit of claim 1 further comprising an engine control unit connected to the heat exchange unit, the engine control unit configured to activate the first energy generation module based upon the first vapor pressure of the vapor and the second energy generation module based upon the second vapor pressure of the vapor.

17. The heat exchange unit of claim 1 wherein the first energy generation module or the second energy generation module have a modular configuration for enabling replacement of the first energy generation module or the second energy generation module with a third energy generation module having the same modular configuration.

18. The heat exchange unit of claim 1 wherein the fluid and the hot air do not mix.

19. The automobile of claim 7 wherein the first energy generation module or the second energy generation module are modularly designed to enable replacement of the first energy generation module or the second energy generation module with a third energy generation module having the same modular design.

20. The heat exchange unit of claim 16 wherein the engine control unit is configured to activate the first energy generation module and the second energy generation module based upon a third vapor pressure of the vapor.

21. The heat exchange unit of claim 1 wherein the first energy generation module is connected to an auxiliary battery of the automobile and the second energy generation module is connected to a main battery of the automobile.

22. A heat exchange unit for an automobile comprising:
a core unit having a fluid therein and configured to convert the fluid to a body of vapor having a pressure;
a first energy generation module having a first maximum pressure value and connected to the core unit via a first connection, the first connection arranged to selectively pass the body of vapor generated by the core unit to the first energy generation module;
a second energy generation module having a second maximum pressure value and connected to the core unit via a second connection, the second connection arranged to selectively pass the body of vapor generated by the core unit to the second energy generation module; and
an engine control unit configured to activate the first energy generation module with a first volume of the body of vapor via the first connection and activate the second energy generation module with a second volume of the body of vapor via the second connection when the pressure of the body of vapor is greater than at least one of the first maximum pressure value or the second maximum pressure value.

23. The heat exchange unit of claim 22 wherein the first maximum pressure value is different from the second maximum pressure value.

24. The heat exchange unit of claim 22 wherein the controller is an engine control unit.

25. The heat exchange unit of claim 22 further comprising a battery connected to the first energy generation module.

26. The heat exchange unit of claim 22 further comprising an air conditioning unit connected to the first energy generation module.

27. The heat exchange unit of claim 2 further comprising an electronic accessory connected to the first energy generation module.

* * * * *